Dec. 8, 1931.    M. E. FISHER    1,835,939
CHICKEN WATERER
Filed July 5, 1929
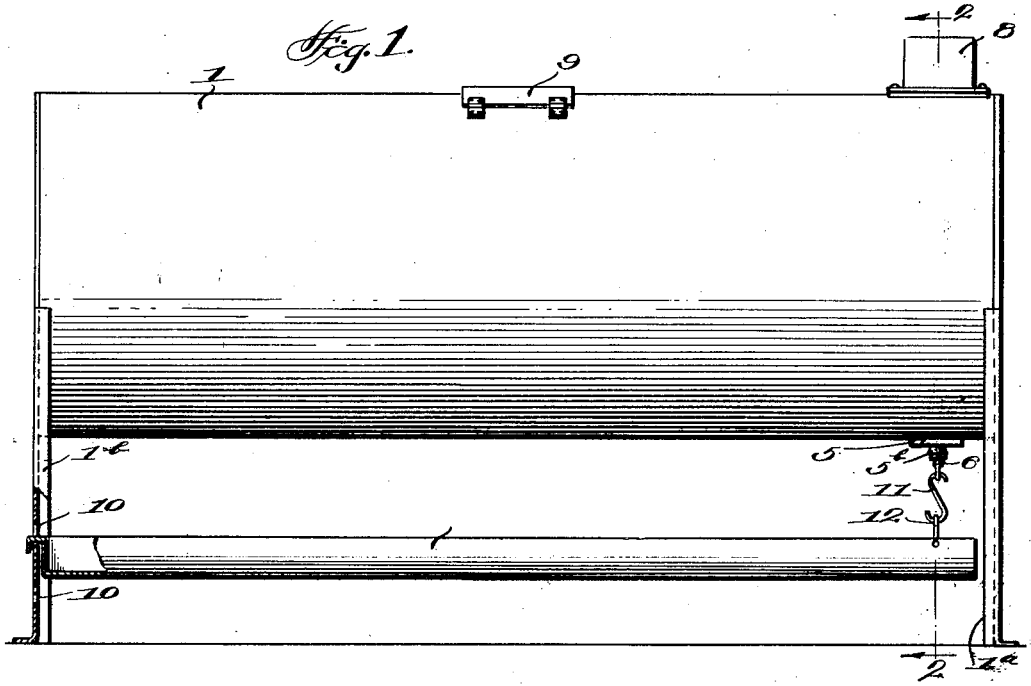
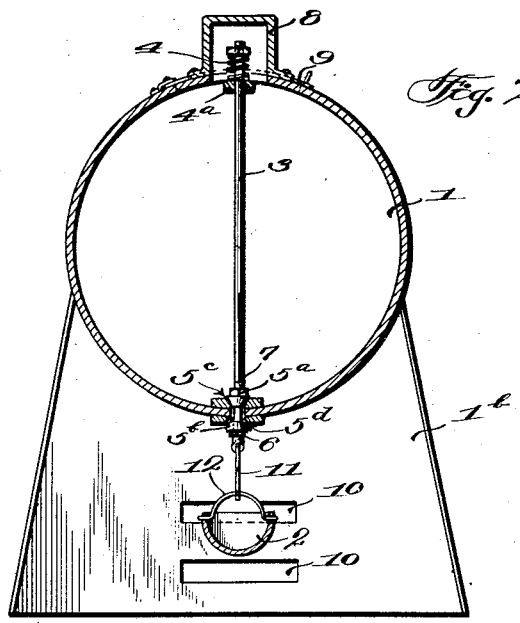
WITNESS
INVENTOR
Melvin Earl Fisher
BY
ATTORNEY Patented Dec. 8, 1931

1,835,939

UNITED STATES PATENT OFFICE

MELVIN EARL FISHER, OF LEXINGTON, NEBRASKA

CHICKEN WATERER

Application filed July 5, 1929. Serial No. 376,156.

My invention relates to poultry drinking fountains and it consists in the constructions, arrangements and combinations herein described and claimed.

It is an object of my invention to provide a drinking fountain wherein water discharged from a main receptacle to a trough may be controlled by a simple automatic valve.

A further object of the invention is the provision of a movable trough associated with a two-way valve, whereby weight of water in the trough will control the opening and closing of the valve.

Additional objects, advantages and features of invention will be apparent from the following description and drawings, wherein:—

Figure 1 is a side elevation of a drinking fountain constructed in accordance with my invention.

Figure 2 is a cross section on the line 2—2 of Figure 1.

In carrying out my invention, I provide a cylindrical tank 1 closed at both ends and suitably supported by pedestal 1ª and 1ᵇ.

Adjacent the pedestal 1ª, the tank 1 is apertured to receive a two-way valve 5 reciprocable therein. The valve 5 comprises valves faces 5ª and 5ᵇ adapted to seat against valve seats 5ᶜ and 5ᵈ, respectively upon reciprocation of the valve, as will presently appear.

An operating rod 3 extends upwardly from the valve 5 and is slidably journaled through a support 4ª adjacent the upper part of the tank. The rod 3 is suitably headed by a nut and confines a compression spring 4 between the underside thereof and the support 4ª. The weight of the trough 2 and the spring 4 normally holds the valve 5 open, and the tension of this spring may be varied by manipulating the nut, as will be apparent. Access to the adjusting nut and spring 4 may be had by removing the cover 8.

A consideration of Fig. 2 discloses the fact that the valves 5ª and 5ᵇ are screwed upon the rod 3, and suitably locked in adjusted positions by lock nuts 6 and 7.

The lower extremity of the rod 3 terminates in an eyelet to receive a hook 11, which in turn is engaged in a bail 12 of the trough 2. By this construction, the trough may be readily detached from the rod, to facilitate cleaning or removal otherwise.

The pedestal 1ᵇ is provided with a pair of superposed slots 10, within which the adjacent end of the trough 2 may be rockably supported. It will be noted that the trough may be adjusted within one or the other of these slots, thereby raising or lowering the trough, as the case may be, to accommodate large or small chickens.

The tank 1 may be provided with a suitable filling opening closed by a lid 9, as shown in Fig. 1.

In the use of my fountain, the tank 1 being filled with water, and the trough 2 having a small portion of water therein, the double acting valve 5 will be in such position so as to hold the valve faces 5ª and 5ᵇ away from their seats, thus permitting water to flow from the tank 1 into the trough 2. As soon as the weight of the water in the trough has increased sufficiently to overcome the tension of the spring 4, the valve face 5ª will seat against the valve seat 5ᶜ thus stopping the flow of water to the trough 2. It will be understood, of course, that as soon as the water in the trough 2 has again been reduced, the spring 4 will pull the rod 3 upwardly, raising the valve 5ª to again allow water to flow to the trough.

It should be noted that the tension of the spring 4 is such as to support the trough 2 and retain the valve faces 5ª and 5ᵇ in their unseated positions. Thus it will be apparent that when the trough 2 is removed for cleaning, the spring 4 will be sufficient to raise the rod 3 upwardly to cause seating of the valve face 5ᵇ in the valve 5ᵈ, thereby closing the valve against any outward flow of water. However, as soon as the trough 2 has again been placed in position upon the hook 11 the weight of the trough will pull downwardly upon the rod 3 to bring the valve faces 5ª and 5ᵇ to an intermediate or open position.

It will be readily apparent that I have provided a fountain of simple construction, yet efficient in operation.

I claim:—

1. A poultry drinking fountain comprising a supply tank supported upon pedestals, a vertically reciprocable rod mounted in said tank and movable through an opening having opposed valve seats, opposed valves on said rod for alternate seating engagement with said valve seats, a trough disposed beneath said supply tank and rockably suspended from one of said pedestals, and means connecting the free end of said trough with said reciprocable rod.

2. A poultry drinking fountain comprising a supply tank supported upon pedestals, a vertically reciprocable rod, a bearing at the upper portion of said tank and supporting said rod, said rod being movable through an opening formed in the lower side of said tank, said opening having opposed valve seats, opposed valves on said rod for alternate seating engagement with said valve seats, a trough disposed beneath said supply tank and rockably suspended from one of said pedestals, spring means interposed between said rod and bearing normally holding said valves in open positions, and means connecting the free end of said trough with said reciprocable rod.

3. A poultry fountain comprising a supply tank having supporting pedestals, one of said pedestals having superposed slots, a trough, said trough having one end constructed for engagement in either of said slots, an automatic valve associated with said supply tank for discharging water to said trough, and adjustable means connecting the other end of said trough and said valve.

In testimony whereof I have signed my name to this specification.

MELVIN EARL FISHER.